United States Patent
Simmons

(10) Patent No.: US 10,308,271 B2
(45) Date of Patent: Jun. 4, 2019

(54) STEERING WHEEL COVER

(71) Applicant: AUTO-GRIP LLC, Commerce City, CO (US)

(72) Inventor: Grant M. Simmons, Commerce City, CO (US)

(73) Assignee: Auto-Grip LLC, Commerce City, CO (US)

( * ) Notice: Subject to any disclaimer, the term of this patent is extended or adjusted under 35 U.S.C. 154(b) by 224 days.

(21) Appl. No.: 15/160,285

(22) Filed: May 20, 2016

(65) Prior Publication Data
US 2016/0347346 A1 Dec. 1, 2016

Related U.S. Application Data

(60) Provisional application No. 62/169,475, filed on Jun. 1, 2015.

(51) Int. Cl.
B62D 1/06 (2006.01)
B62D 1/11 (2006.01)

(52) U.S. Cl.
CPC ..................... B62D 1/06 (2013.01)

(58) Field of Classification Search
CPC .................. B62D 1/06; B62D 1/11
USPC .......................................... 74/558
See application file for complete search history.

(56) References Cited

U.S. PATENT DOCUMENTS

| 1,190,781 | A |   | 7/1916  | Maher |   |
|-----------|---|---|---------|-------|---|
| 1,472,689 | A |   | 10/1923 | Skiles |   |
| 4,105,200 | A |   | 8/1978  | Unger |   |
| 4,441,382 | A |   | 4/1984  | Snooks |   |
| 4,579,775 | A |   | 4/1986  | Ohta et al. |   |
| 4,726,624 | A | * | 2/1988  | Jay ......................... | A47C 7/021 297/452.23 |
| 5,005,824 | A |   | 4/1991  | Eichel |   |
| 5,190,504 | A |   | 3/1993  | Scatterday |   |
| 5,207,713 | A |   | 5/1993  | Park |   |
| 5,600,853 | A | * | 2/1997  | Yewer, Jr. ............ | A41D 13/082 2/161.1 |

(Continued)

FOREIGN PATENT DOCUMENTS

| EP | 0304324 A1 | * | 2/1989 | ............... B62D 1/06 |
| GB | 2435087 A | * | 8/2007 | ............... B62D 1/06 |

(Continued)

OTHER PUBLICATIONS

EPO Machine Translation of KR20130001272 (U) of Young, Feb. 27, 2013 (Year: 2013).*

(Continued)

Primary Examiner — Vinh Luong
(74) Attorney, Agent, or Firm — Dorsey & Whitney LLP

(57) ABSTRACT

A steering wheel cover is provided. The steering wheel cover is attachable to steering wheels for a variety of vehicles including, but not limited to, all-terrain vehicles (for example, side by side all-terrain vehicles), automobiles, boats, and golf carts. The steering wheel cover may include one or more resiliently-deformable regions configured to increase a user's grip strength, for example. The resiliently-deformable regions may include resiliently-deformable members, such as gel cushions or pads, that resiliently deform under pressure applied by a user and return to their original shape when the pressure is no longer applied by the user.

17 Claims, 6 Drawing Sheets

(56) References Cited

U.S. PATENT DOCUMENTS

| | | |
|---|---|---|
| D395,629 S | 6/1998 | Moore, Jr. |
| D429,671 S | 8/2000 | Stevens |
| D436,068 S | 1/2001 | Stevens |
| D437,272 S | 2/2001 | Lin |
| 6,413,455 B1 | 7/2002 | Yates |
| D506,957 S | 7/2005 | Huang |
| D507,771 S | 7/2005 | Wang |
| D517,964 S | 3/2006 | Huang |
| D526,255 S | 8/2006 | Peng |
| 7,661,748 B2 | 2/2010 | Abraham |
| 7,877,843 B2 * | 2/2011 | Holland-Letz ............ B25G 1/01 16/430 |
| D635,899 S | 4/2011 | Anzi |
| 8,101,887 B2 | 1/2012 | Pate |
| 8,506,418 B2 * | 8/2013 | Tremulis ................ A63B 53/14 473/300 |
| 8,564,424 B2 | 10/2013 | Evarts et al. |
| D701,153 S | 3/2014 | Shen |
| D704,110 S | 5/2014 | Shen |
| D704,111 S | 5/2014 | Shen |
| D710,272 S | 8/2014 | Shen |
| 9,180,812 B2 | 11/2015 | Colvin, Sr. |
| D744,392 S | 12/2015 | Pittman |
| D809,441 S | 2/2018 | Simmons et al. |
| 2003/0024343 A1 * | 2/2003 | Perezlmize ............. B62D 1/06 74/558 |
| 2004/0050205 A1 | 3/2004 | Putnam |
| 2009/0007721 A1 | 1/2009 | Cortina et al. |
| 2009/0096261 A1 | 4/2009 | Abraham et al. |
| 2009/0314128 A1 | 12/2009 | Rick |
| 2010/0107806 A1 | 5/2010 | Corinaldi et al. |
| 2010/0139449 A1 | 6/2010 | Garcia-Mejia |
| 2010/0193495 A1 | 8/2010 | Pate |
| 2011/0133919 A1 | 6/2011 | Evarts et al. |
| 2011/0245643 A1 | 10/2011 | Lisseman et al. |
| 2014/0053371 A1 * | 2/2014 | Feinstein ................. B25G 1/01 16/430 |
| 2014/0053679 A1 | 2/2014 | He |
| 2014/0259501 A1 * | 9/2014 | Post ......................... A47L 1/15 15/231 |
| 2015/0217687 A1 | 8/2015 | Colvin, Sr. |
| 2015/0217794 A1 | 8/2015 | Kong et al. |
| 2015/0239487 A1 | 8/2015 | Huang |
| 2016/0107674 A1 * | 4/2016 | Fiumefreddo ........... B62D 1/06 74/558 |
| 2016/0129665 A1 * | 5/2016 | Cho ........................ B32B 5/022 442/370 |
| 2016/0194022 A1 * | 7/2016 | Williams ................. B62D 1/06 74/558 |

FOREIGN PATENT DOCUMENTS

| | | | |
|---|---|---|---|
| JP | 403082680 A | * | 4/1991 |
| KR | 20130001272 U | * | 2/2013 |

OTHER PUBLICATIONS

Basic Abstract of KR20130001272 (U) of Young, Feb. 27, 2013 (Year: 2013).*

English Abstract of JP403082680A of Sugiyama et al., Apr. 8, 1991 (Year: 1991).*

* cited by examiner

STEERING WHEEL COVER

CROSS REFERENCE TO RELATED APPLICATIONS

The present application claims priority under 35 U.S.C. § 119(e) to U.S. Provisional Application No. 62/169,475, entitled "STEERING WHEEL COVER", and filed Jun. 1, 2015, which is hereby incorporated by reference herein in its entirety.

FIELD

The present disclosure generally relates to an exercise device, and more particularly to a steering wheel cover.

BACKGROUND

Steering wheel covers are commonly used to cover a steering wheel of a vehicle. Conventional steering wheel covers generally do not have the capability of measurably improving a user's grip strength. Example measurement parameters may include, for example, dynamometer strength, increased blood flow, reduced incidence of injury, sporting performance improvement, and other parameters utilized to determine hand and forearm exercise benefits.

SUMMARY

According to some embodiments, a device and method to improve a user's hand and forearm strength is provided. In some embodiments, the device can be attached easily and safely onto an existing vehicle. In some embodiments, a steering wheel cover for a vehicle is provided. The steering wheel cover may include multiple resilient members configured to resiliently deform when a user applies pressure to the resilient members and to return to their original shape when the user-applied pressure is removed. The user may repeatedly apply and not apply pressure to the resilient members to exercise the user's hands and forearms, thereby improving their grip strength.

This summary of the disclosure is given to aid understanding, and one of skill in the art will understand that each of the various aspects and features of the disclosure may be used separately in some instances, or in combination with other aspects and features of the disclosure in other instances. Accordingly, while the disclosure is presented in terms of embodiments, it should be appreciated that individual aspects of any embodiment can be claimed separately or in combination with aspects and features of that embodiment or any other embodiment.

The present disclosure is set forth in various levels of detail in this application and no limitation as to the scope of the claimed subject matter is intended by either the inclusion or non-inclusion of elements, components, or the like in this summary. In certain instances, details that are not necessary for an understanding of the disclosure or that render other details difficult to perceive may be omitted. It should be understood that the claimed subject matter is not necessarily limited to the particular embodiments or arrangements illustrated herein.

BRIEF DESCRIPTION OF THE DRAWINGS

The accompanying drawings, which are incorporated into and constitute a part of the specification, illustrate embodiments of the disclosure and, together with the general description given above and the detailed description given below, serve to explain the principles of these embodiments.

DETAILED DESCRIPTION

Referring to FIGS. 1-6, a steering wheel cover 100 is provided that may be detachably mountable onto a steering wheel 102 of a vehicle. When mounted onto the steering wheel 102, the steering wheel cover 100 and the steering wheel 102 may be concentric, and the steering wheel cover 100 may completely surround an outer periphery of the steering wheel 102. The steering wheel cover 100 may be manufactured to fit onto steering wheels of various diameters. For example, the steering wheel cover 100 may be manufactured to fit all-terrain vehicles, boats, cars, golf carts, trucks, or any other vehicle having a steering wheel.

Referring still to FIGS. 1-6, the illustrated steering wheel cover 100 is formed as a toroid, and may be referred to as being annular, ring, or circular shaped. The steering wheel cover 100 is configured to wrap around the outer circumferential surface of the steering wheel 102 and defines an opening 106 along an inner periphery of the steering wheel cover 100 that is sized to snugly receive the steering wheel 102. When the steering wheel cover 100 is positioned around the steering wheel 102, the steering wheel 102 is substantially hidden by the cover 100.

Figure 1:
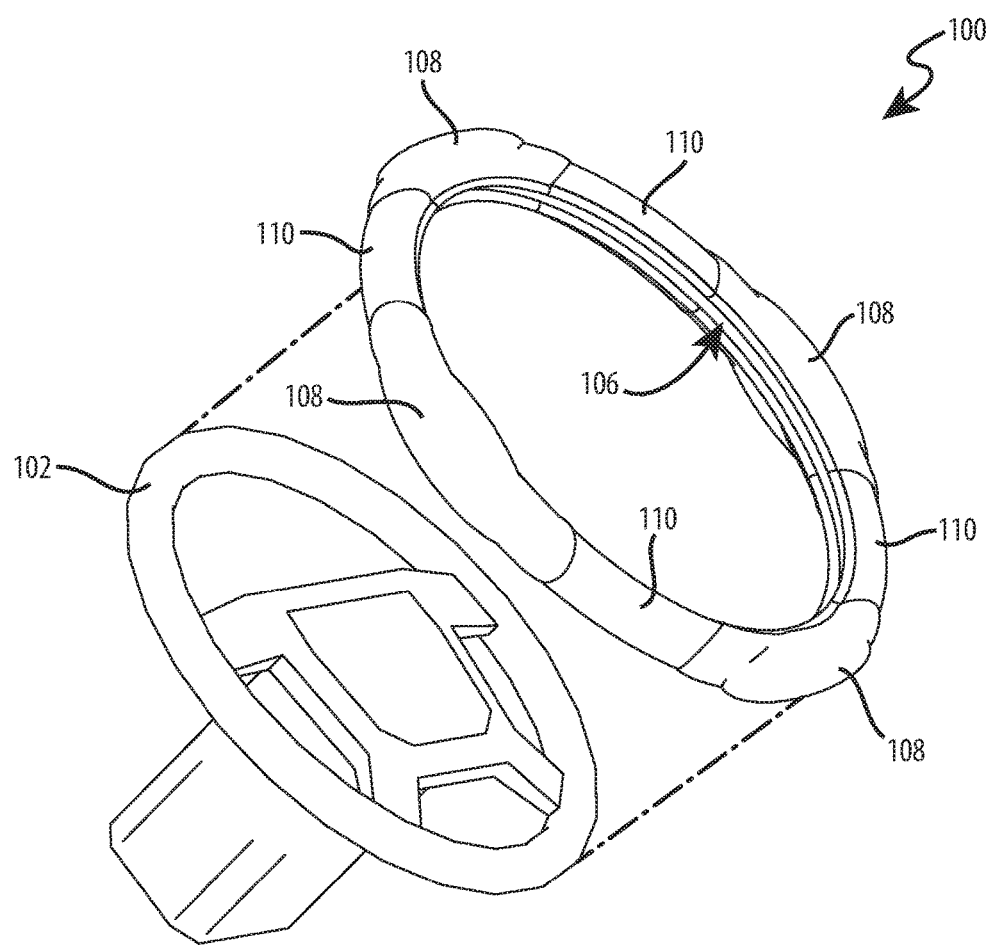
FIG. 1 is a front isometric, exploded view of a steering wheel cover and a steering wheel in accordance with some embodiments of the present disclosure.
Figure 2:
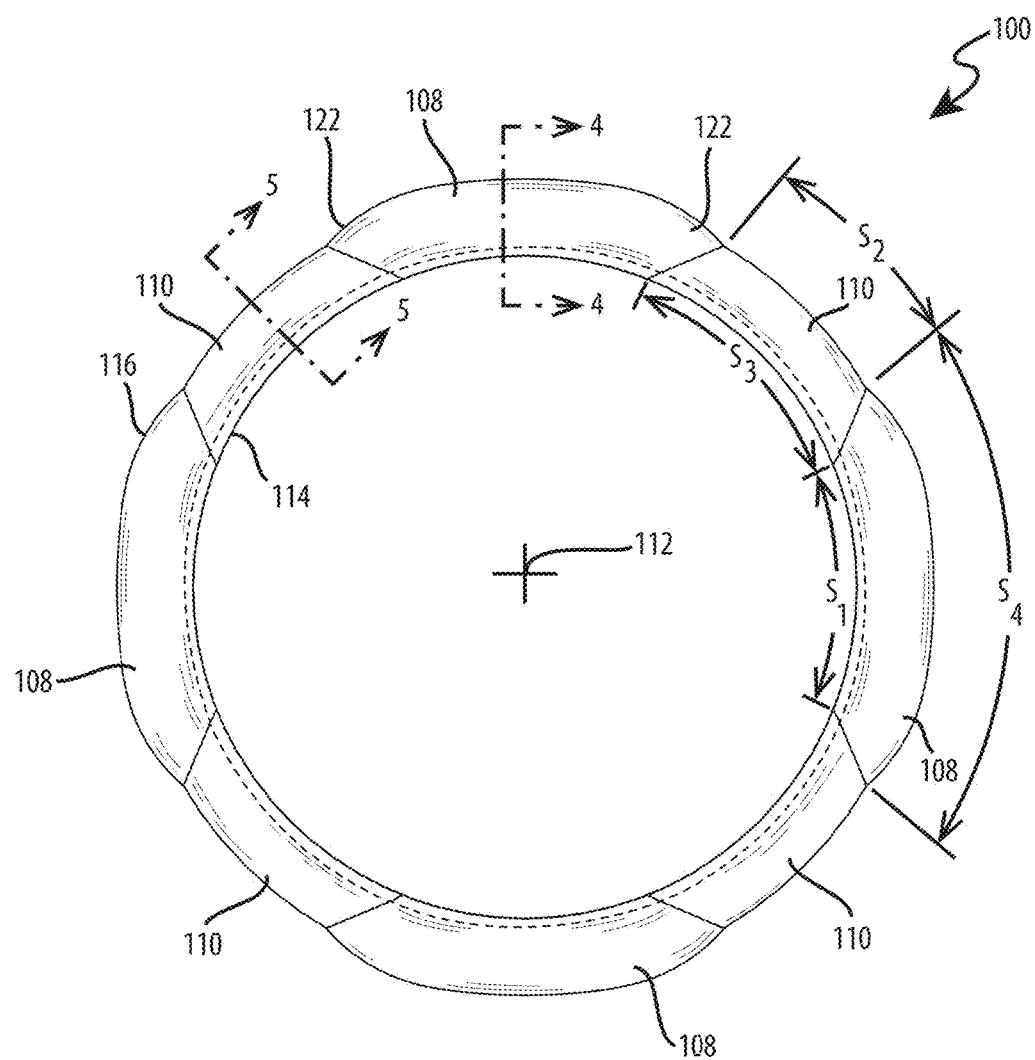
FIG. 2 is a front elevation view of the steering wheel cover of FIG. 1 in accordance with some embodiments of the present disclosure.
Figure 3:
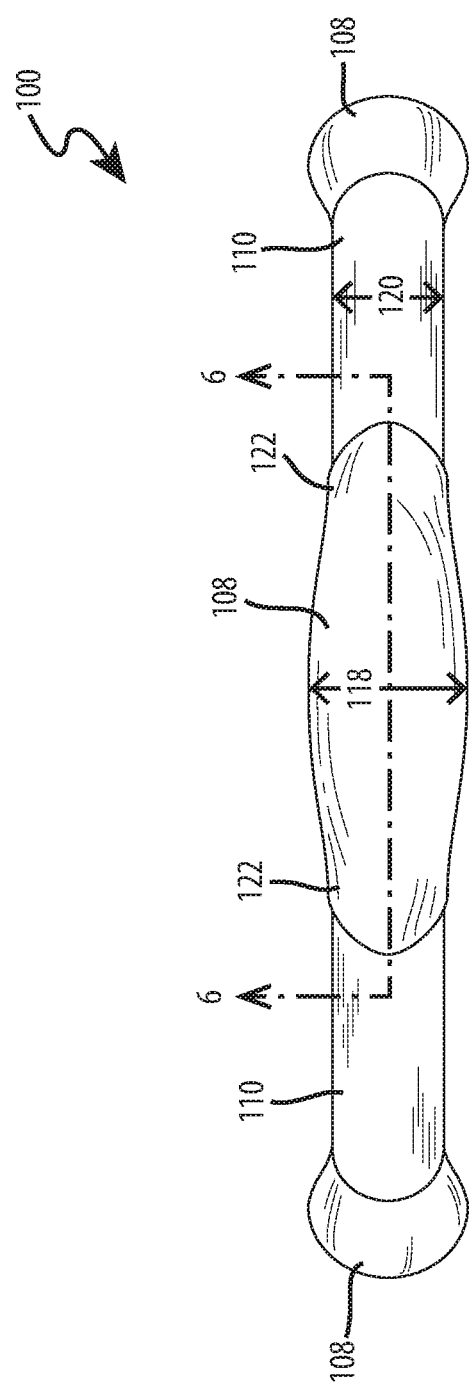
FIG. 3 is a top plan view of the steering wheel cover of FIG. 1 in accordance with some embodiments of the present disclosure.

Referring to FIGS. 1-3, the steering wheel cover 100 may include multiple regions that alternate with one another around the circumference of the steering wheel. A first set of regions 108 may be resiliently deformable and may be referred to herein as resiliently-deformable regions. A second set of regions 110 may be less deformable than the first set of regions and may be referred to herein as less-deformable regions. The resiliently-deformable regions 108 and the less-deformable regions 110 may alternate along a circular path defined by a radius originating at a center of curvature of the steering wheel cover 100.

With continued reference to FIGS. 1-3, the resiliently-deformable regions 108 may be separated from one another by the less-deformable regions 110 of the steering wheel cover 100. In some embodiments, the resiliently-deformable regions 108 are spaced equidistantly apart from one another. In FIG. 1, the steering wheel cover 100 includes four resiliently-deformable regions 108 spaced equidistantly apart from one another. Similarly, the steering wheel cover 100 includes four less-deformable regions 110 spaced equidistantly apart from one another. It should be appreciated that the steering wheel cover 100 may include more or less than four resiliently-deformable regions 108, such as one or more resiliently-deformable regions. Similarly, it should be appreciated that the steering wheel cover 100 may include one or more less-deformable regions 110.

With reference to FIG. 2, the steering wheel cover 100 may be symmetrical around a center of curvature 112 of the cover 100. The resiliently-deformable regions 108 and the less-deformable regions 110 of the cover 100 may extend along the entire circumference of the steering wheel and form an annular or ring shape. The resiliently-deformable regions 108 may be identical to one another, and the less-deformable regions 110 may be identical to one another. Each resiliently-deformable region 108 may have a minimum arc length $S_1$ sufficient to accommodate the width of a user's hand, and each less-deformable region 110 may have a minimum arc length $S_2$ sufficient to accommodate the width of a user's hand. In some embodiments, the minimum arc lengths $S_1$ of the resiliently-deformable regions 108 are located along an inner periphery 114 of the steering wheel cover 100, and the minimum arc lengths $S_2$ of the less-deformable regions 110 are located along an outer periphery 116 of the cover 100.

While driving, a user may position their hands around two of the less-deformable regions 110 to manipulate the steering wheel of the vehicle. While not driving, the user may position their hands around two of the resiliently-deformable regions 108 and squeeze the resiliently-deformable regions 108 to increase hand, wrist, and forearm strength. Repeatedly squeezing the resiliently-deformable regions 108 generally improves the user's grip strength, thereby safely and effectively helping to prevent injury, relieve fatigue, and strengthen muscles in the hand, wrist, and forearm. It may also increase hand-wrist flexibility and dexterity, facilitate upper arm and shoulder development, reduce stress, improve cardiovascular fitness and injury rehabilitation, and reduce the likelihood of or treat arthritis, carpal tunnel syndrome, tennis elbow, and tendonitis, for example.

With continued reference to FIG. 2, the inner arc lengths $S_1$, $S_3$ may form a circular inner periphery 114 of the steering wheel cover 100. The inner arc length $S_1$ of each resiliently-deformable region 108 may be the same or substantially the same as the inner arc length $S_3$ of each less-deformable region 110. The outer arc lengths $S_3$, $S_4$ may form a non-circular outer periphery 116 of the steering wheel cover 100. The outer arc length $S_4$ of each resiliently-deformable region 108 may be greater than the outer arc length $S_2$ of each less-deformable region 110. The resiliently-deformable regions 108 may protrude outwardly from the less-deformable regions 110 to form bulges or protuberances around the steering wheel cover 100 for the user to grasp and squeeze. The resiliently-deformable regions 108 may have a generally inverted trapezoidal shape, and the less-deformable regions 110 may have a generally trapezoidal shape. In some embodiments, the resiliently-deformable regions 108 and the less-deformable regions 110 have non-trapezoidal shapes.

FIG. 3 is a top plan view of the steering wheel cover 100 in accordance with some embodiments of the present disclosure. As illustrated in FIG. 3, the resiliently-deformable regions 108 may have a depth 118 that is greater than a depth 120 of the less-deformable regions 110. In other words, the resiliently-deformable regions 108 may protrude forwardly and rearwardly from the less-deformable regions 110 to form bulges or protuberances around the front and rear sides of the steering wheel cover 100 for the user to grasp and squeeze. By protruding forwardly and rearwardly along the front and rear sides of the cover 100, the resiliently-deformable regions 108 enable the user to obtain a full-hand exercise, including muscles in their fingers and palms of their hands. As shown in FIGS. 2 and 3, the resiliently-deformable regions 108 may taper along their end portions 122 toward the less-deformable regions 110 to provide a substantially smooth transition between the regions 108, 110.

Figure 4:
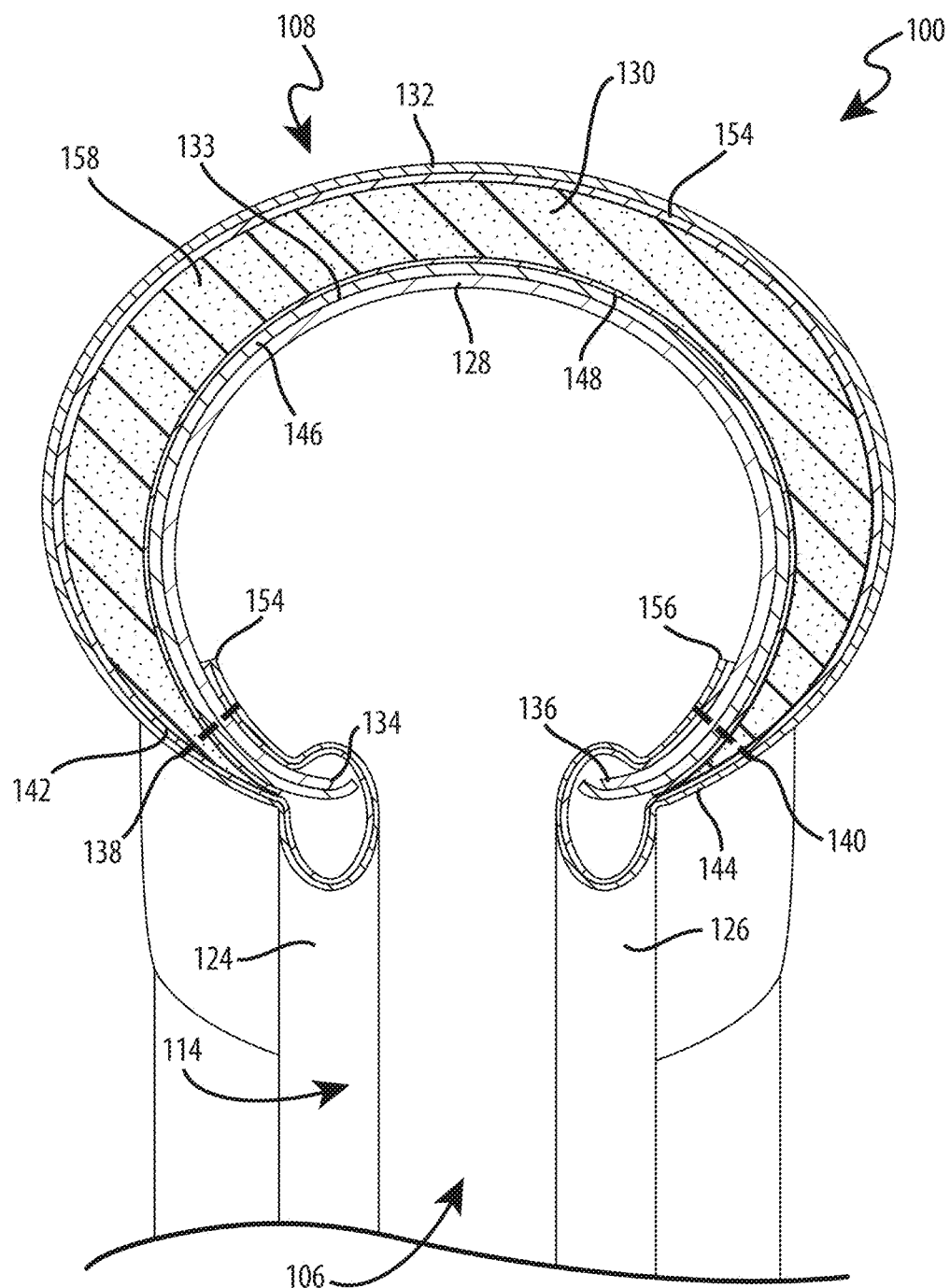
FIG. 4 is an enlarged, fragmentary transverse section view of the steering wheel cover of FIG. 1 taken along line 4-4 of FIG. 2 in accordance with some embodiments of the present disclosure.

FIG. 4 is an enlarged, fragmentary transverse cross section view of the steering wheel cover 100 in accordance with some embodiments of the present disclosure. The steering wheel cover 100 may have an arcuate or curved cross section and may extend more than 180 degrees around an outer surface of a steering wheel 102 (see FIG. 1) from a front side to a rear side of the steering wheel 102. In some embodiments, the steering wheel cover 100 extends about 270 degrees around an outer surface of a steering wheel 102 from a front side to a rear side of the steering wheel 102. The steering wheel cover 100 generally has an inverted U-shaped cross-section. The opening 106 of the steering wheel cover 100 is formed along the inner periphery 114 of the cover 100 and may be sized to snugly receive the steering wheel 102. The opening 106 is defined between inner circumferential edge portions 124, 126 of the cover 100 that are spaced laterally apart from each other. The edge portions 124, 126 may be spaced apart from each other by a distance that is less than a depth dimension of the steering wheel 102 such that the edge portions 124, 126 are separated from one another by the steering wheel 102 as the cover 100 is mounted onto the steering wheel 102.

Referring still to FIG. 4, a cross section of a resiliently-deformable region 108 is depicted. The resiliently-deformable region 108 may include multiple layers stacked upon one another in a radial direction. The resiliently-deformable region 108 may include a base or core layer 128, a resiliently-deformable member 130, and an outer layer or covering 132. The base layer 128 may be formed as a toroid, and may be referred to as being annular or ring shaped. The resiliently-deformable members 130 may be spaced apart from one another along an outer surface 133 of the base layer 128. The outer layer 132 may cover the resiliently-deformable members and may provide a surface for a user to grip.

With continued reference to FIG. 4, the base layer 128 may form the innermost layer of the resiliently-deformable region 108. The base layer 128 may provide structural stiffness to the steering wheel cover 100 to retain the annular shape of the cover 100. The base layer 128 may have an arcuate or curved cross section and extend more than 180 degrees around an outer surface of a steering wheel 102 (see FIG. 1) from a front side to a rear side of the steering wheel 102. In some embodiments, the base layer 128 extends about 270 degrees around an outer surface of the steering wheel 102 from a front side to a rear side of the steering wheel 102. The base layer 128 may have an inverted U-shaped cross-section. The base layer 128 may include a pair of inner circumferential edges 134, 136 that are spaced laterally apart from each other. The edges 134, 136 of the base layer 128 may be spaced apart from each other by a distance that is less than a depth dimension of the steering wheel 102 such that the edges 134, 136 are separated from one another by the steering wheel 102 as the cover 100 is mounted onto the steering wheel 102.

The base layer 128 may be formed from various materials. In some embodiments, the base layer 128 is formed from a material with sufficient slip resistance to ensure the steering wheel cover 100 does not slip relative to the steering wheel 102 during use. In some embodiments, the base layer 128 is formed from a thermoplastic elastomer, sometimes referred to as a thermoplastic rubber.

With continued reference to FIG. 4, the outer layer 132 may form the outermost layer of the resiliently-deformable region. The outer layer 132 generally provides an engagement surface for a user. The outer layer 132 is positioned outwardly of the base layer 128. The outer layer 132 may wrap around the inner edges 134, 136 of the base layer 128 and may be secured to the base layer 128 proximate to the inner edges 134, 136 along lines of attachment 138, 140, such as stitching, adhesive, or other forms of attachment. The outer layer 132 may have a substantially uniform thickness and may be stretchable. In some embodiments, the outer layer 132 is formed from a material with sufficient elasticity to deform in unison with the resiliently-deformable member 130 when the member 130 is compressed by a user. In some embodiments, the outer layer 132 is formed from nylon, polyester, elastane, or other sufficiently-elastic materials suitable for covering the resiliently-deformable member 130.

Referring still to FIG. 4, the resiliently-deformable member 130 is positioned between the base layer 128 and the outer layer 132 and may be referred to herein as a cushion, insert, or pad. The radial thickness of the resiliently-deformable member 130 may be greater than the thickness of the base layer 128 and the outer layer 132. In some embodiments, the resiliently-deformable member 130 has a thickness of between about 5 millimeters and about 12 millimeters. In some embodiments, the resiliently-deformable member 130 has a thickness of between about 6 millimeters and about 8 millimeters.

Referring still to FIG. 4, the resiliently-deformable member 130 may wrap around the outer surface 133 of the base layer 128 from near the first inner circumferential edge 134 to near the second inner circumferential edge 136 of the base layer 128. The resiliently-deformable member 130 may extend around substantially the entire outer surface 133 of the base layer 128 between the inner circumferential edges 134, 136 to provide sufficient surface area for a user to fully engage and exercise their hands. In some embodiments, the resiliently-deformable member 130 extends at least about 270 degrees around a steering wheel received in the opening 106 defined by the steering wheel cover 100.

With continued reference to FIG. 4, the resiliently-deformable member 130 may be secured to the base layer 128 along longitudinally-extending edge portions 142, 144 of the resiliently-deformable member 130. In some embodiments, the resiliently-deformable members 130 are attached to the base layer 128 along the lines of attachment 138, 140 that attach the outer layer 132 to the base layer 128. The lines of attachment 138, 140 may extend around in a circular path around an inner portion of the cover 100 proximate the edges 134, 136 of the base layer 128. The lines of attachment 138, 140 may be formed as lines of stitching. The longitudinally-extending edge portions 142, 144 of the resiliently-deformable member 130 may include terminal edges positioned between the edges 134, 136 of the base layer 128 and the lines of attachment 138, 140, respectively. In some embodiments, the resiliently-deformable member 130 is adhered to the base layer 128. The resiliently-deformable member 130 may taper inwardly toward the edges 134, 136 of the base layer 128 along the longitudinally-extending edge portions 142, 144. In other words, the thickness of the resiliently-deformable member 130 may vary, with the middle portion 158 of the resiliently-deformable member 130 having a larger thickness than the longitudinally-extending edge portions 142, 144 of the resiliently-deformable member 130. The resiliently-deformable member 130 may have a substantially uniform thickness along a majority of the width of the resiliently-deformable member 130. For example, the middle portion 158 of the resiliently-deformable member 130 may have a substantially uniform thickness.

The resiliently-deformable member 130 may be formed of various materials. In some embodiments, the resiliently-deformable member 130 is formed from a gel material having good memory retention. In some embodiments, the resiliently-deformable member 130 is formed with gelated polymer surrounding discrete foam pieces. An example material is described in U.S. Pat. No. 6,413,455, which is hereby incorporated by reference herein in its entirety for all purposes. In some embodiments, the resiliently-deformable member 130 has a breaking strength of between about 20 psi and about 25 psi, and an ultimate elongation of between about 1350 percent and about 1450 percent pursuant to ASTM D 412-06ae2. In some embodiments, the resiliently-deformable member 130 has a deflection of about 10 percent when about 1 psi of compression is applied to the resiliently-deformable member 130, a deflection of about 20 percent when about 3 psi of compression is applied to the resiliently-deformable member 130, a deflection of about 25 percent when about 4 psi of compression is applied to the resiliently-deformable member 130, a deflection of about 30% when about 6 psi of compression is applied to the resiliently-deformable member 130, and a deflection of about 50% when about 13 psi of compression is applied to the resiliently-deformable member 130. Testing may be performed pursuant to ASTM D 575-91(07), Method A.

The resiliently-deformable member 130 may be temperature stable. In some embodiments, the resiliently-deformable member 130 does not expand or substantially expand between a temperature range of about −80 degrees Celsius to about 100 degrees Celsius. The temperature stability of the resiliently-deformable member 130 may ensure the resiliently-deformable member 130 maintains its resiliency regardless of the temperature conditions. The resiliently-deformable member 130 may have low flammability and may self-extinguish. The resiliently-deformable member 130 may have minimal moisture (for example, less than 10 ppm) pursuant to the Karl Fischer Moisture test (ISO 15512-99). In some embodiments, the resiliently-deformable member 130 is constructed from rubber, plastic, or various elastomers. In some embodiments, the resilient member is constructed from a blend of neoprene, ethylene propylene diene monomer (M-class) rubber (EPDM rubber), and styrene-butadiene rubber (SBR). In some embodiments, the resilient member is formed of a low density polymer blend, polyethylene-butyl, neoprene, nitrate, hydrin (e.g., epichlorohydrin), or vinyl-nitrile.

Figure 6:
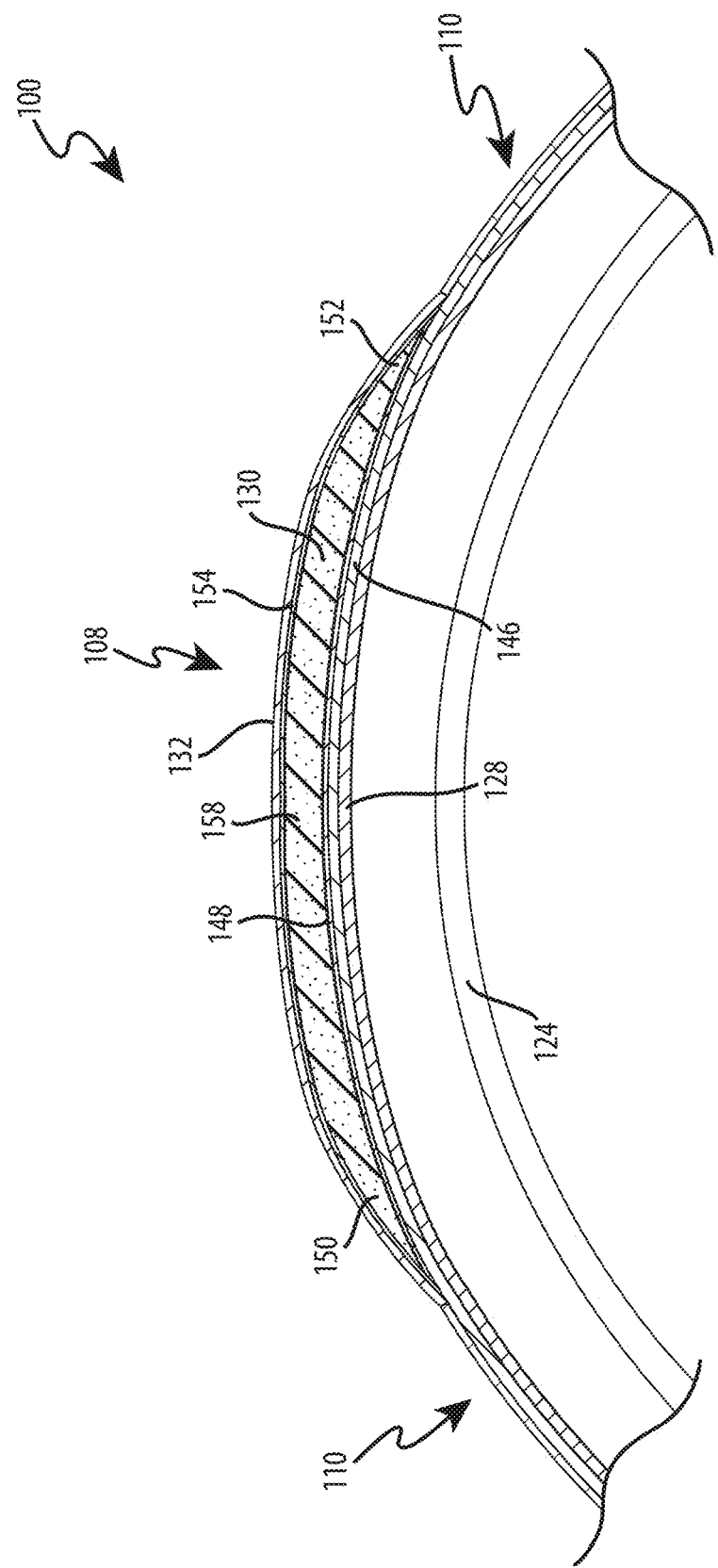
FIG. 6 is an enlarged, fragmentary lengthwise section view of the steering wheel cover of FIG. 1 taken along line 6-6 of FIG. 3 in accordance with some embodiments of the present disclosure.

With reference to FIGS. 4 and 6, the resiliently-deformable region 108 may include a first inner layer 146 located between the base layer 128 and the resiliently-deformable member 130. The first inner layer 146 may extend around substantially the entire outer surface 133 of the base layer 128. For example, the first inner layer 146 may extend from near the first edge 134 to the second edge 136 of the base layer 128 and may form a continuous ring around the base layer 128. The first inner layer 146 may be attached to the base layer 128 with stitching, adhesive, or other forms of securement. In some embodiments, the first inner layer 146 is attached to the base layer 128 with the lines of attachment 138, 140 that attach the outer layer 132 to the base layer 128. The first inner layer 146 may have a smaller thickness than the resiliently-deformable member 130. In some embodiments, the first inner layer 146 is formed of a leather backing covered with a layer of polyurethane.

With continued reference to FIGS. 4 and 6, the resiliently-deformable region 108 may include a second inner layer 148 located between the first inner layer 146 and the resiliently-deformable member 130. The second inner layer 148 may have substantially the same width and length dimensions as the resiliently-deformable member 130. For example, the second inner layer 148 may extend from the first longitudinal edge portion 142 to the second longitudinal edge portion 144 of the resiliently-deformable member 130 (see FIG. 4), and may extend from a first end portion 150 to a second end portion 152 of the resiliently-deformable member 130 (see FIG. 6). The second inner layer 148 may be attached to an underside of the resiliently-deformable member 130 by the natural adhesion properties of the resiliently-deformable member 130, with stitching, adhesive, or other forms of securement. The second inner layer 148 may provide a low friction interface between the resiliently-deformable member 130 and the first inner layer 146. The second inner layer 148 may permit the resiliently-deformable member 130 to move relative to the first inner layer 146. For example, the second inner layer 148 may permit the resiliently-deformable member 130 to elastically lengthen between the lines of attachment 138, 140 in a direction away from the base layer 128 during a squeezing motion imparted on the resiliently-deformable member 130 by the user to ensure a smooth, continuous engagement of the user's hands with the resiliently-deformable member 130 during use. The second inner layer 148 may have a smaller thickness than the resiliently-deformable member 130. In some embodiments, the second inner layer 148 is formed of a copolymer of ethylene and vinyl acetate, such as ethylene-vinyl acetate, such as polyethylene-vinyl acetate.

Referring still to FIGS. 4 and 6, the resiliently-deformable region 108 may include an intermediate outer layer 154 located between the resiliently-deformable member 130 and the outer layer 132. The intermediate outer layer 154 may extend coextensively with the outer layer 132. For example, the intermediate outer layer 154 may extend from one edge 154 to another edge 156 of the outer layer 132 (see FIG. 4), and may extend with the outer layer 154 from the first end portion 150 to the second end portion 152 of the resiliently-deformable member 130 (see FIG. 6). The intermediate outer layer 154 may be attached to an underside of the outer layer 132 with stitching, adhesive, or other forms of securement. The intermediate outer layer 154 may move in unison with the outer layer 132 and may provide a high friction interface between the resiliently-deformable member 130 and the outer layer 132. The intermediate outer layer 154 may ensure the resiliently-deformable member 130 moves substantially in unison with the outer layer 154, and vice versa. For example, during compression of the resiliently-deformable member 130 by a user, the force applied by the user may be transferred through the outer layer 132 to the resiliently-deformable member 130 via the intermediate outer layer 154 with limited slippage between the outer layer 132 and the resiliently-deformable member 130 to ensure a smooth, continuous engagement of the user's hands with the resiliently-deformable member 130 during use. After the compressive force is removed, the intermediate outer layer 154 may ensure the outer layer 132 and the resiliently-deformable member 130 both return to their original positions relative to each other for repeated, consistent use by the user. The second inner layer 148 and the intermediate outer layer 154 may be positioned on opposite sides of the resiliently-deformable member 130. The intermediate outer layer 154 may have a smaller thickness than the resiliently-deformable member 130. In some embodiments, the intermediate outer layer 154 is formed of a foam pad.

With continued reference to FIGS. 4 and 6, the radial thickness of the base layer 128 may be substantially uniform. Similarly, the radial thicknesses of the first inner layer 146, the second inner layer 148, the intermediate outer layer 154, and the outer layer 156 may be substantially uniform. The radial thickness of the base layer 128 may be greater than the radial thicknesses of the second inner layer 148, the intermediate outer layer 154, and the outer layer 156. The radial thickness of the resiliently-deformable member 130 may be variable, with the longitudinal edges 142, 144 and the end portions 150, 152 tapering inwardly toward the base layer 128 from a thicker middle portion of the resiliently-deformable member 130.

Figure 5:
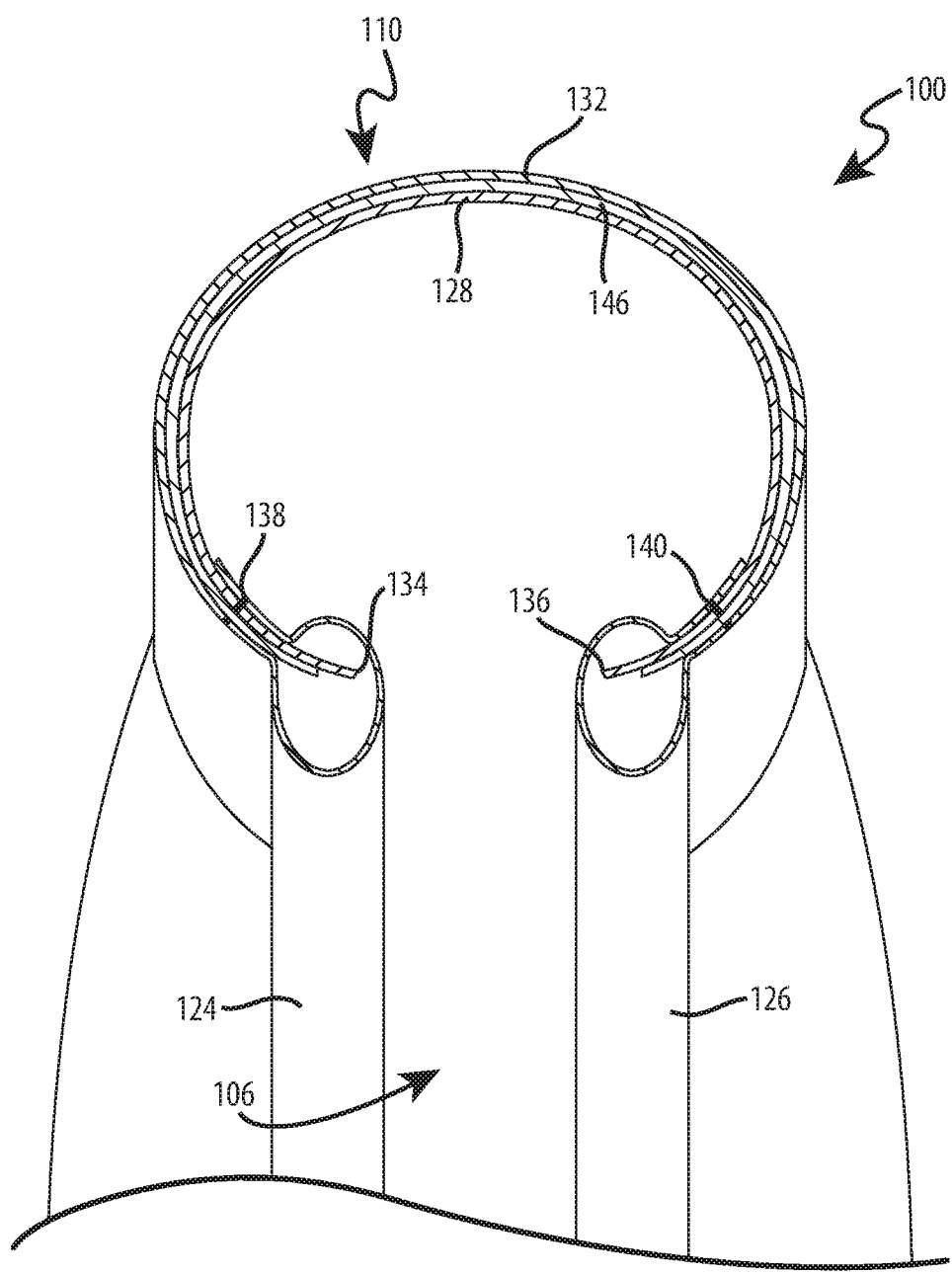
FIG. 5 is an enlarged, fragmentary transverse section view of the steering wheel cover of FIG. 1 taken along line 5-5 of FIG. 2 in accordance with some embodiments of the present disclosure.

FIG. 5 is an enlarged, fragmentary transverse cross section view of the steering wheel cover 100 in accordance with some embodiments of the present disclosure. In FIG. 5, a transverse cross section of the less-deformable region 110 is depicted. The less-deformable region 110 may include the base layer 128, the first inner layer 146, and the outer layer 132. The base layer 128, the first inner layer 146, and the outer layer 132 of the less-deformable region 110 may be substantially identical to the base layer 128, the first inner layer 146, and the outer layer 132 of the resiliently-deformable member 130. The first inner layer 146 may cover substantially the entire outer surface 133 of the base layer 128. The outer layer 132 may cover the first inner layer 146 and may wrap around the edges 134, 136 of the base layer 128. The first inner layer 146 and the outer layer 132 may be attached to the base layer 128 along the lines of attachment 138, 140. The first inner layer 146 and the outer layer 132 may provide some cushioning to the less-deformable region 110. In some embodiments, the outer layer 132 of the less-deformable region 110 is formed of a different material than the outer layer 132 of the resiliently-deformable member 130. In some embodiments, the outer layer 132 of the less-deformable region 110 is less stretchable than the outer layer 132 of the resiliently-deformable member 130. In some embodiments, the less-deformable regions 110 do not include the resiliently-deformable members 130, and thus the outer layer 132 of the less-deformable regions 110 is not subject to as much elastic deformation as the outer layer 132 of the resiliently-deformable regions 108. In some embodiments, the outer layer 132 of the less-deformable region 110 is formed of leather.

FIG. 6 is an enlarged, fragmentary lengthwise cross section view of the steering wheel cover 100 in accordance with some embodiments of the present disclosure. In FIG. 6, a lengthwise cross section of a resiliently-deformable region 108 and adjacent end portions of less-deformable regions 110 are depicted. The resiliently-deformable regions 108 may be more prominent than the less-deformable regions 110 of the steering wheel cover 100. In other words, the resiliently-deformable regions 108 protrude outwardly from the base layer 128 more than the less-deformable regions 110. The resiliently-deformable regions 108 may have a larger radial thickness than the less-deformable regions 110, due at least in part to the inclusion of the resiliently-deformable members 130 in the resiliently-deformable regions 108.

With continued reference to FIG. 6, the resiliently-deformable member 130 may have a substantially uniform thickness along a majority of the length of the resiliently-deformable member 130. The end portions 150, 152 of the resiliently-deformable member 130 may taper inwardly toward the base layer 128 to create a smooth transition between the resiliently-deformable regions 108 and the less-deformable regions 110 of the steering wheel cover 100. In other words, the end portions 150, 152 of the resiliently-deformable member 130 may have a smaller thickness than a middle portion 158 of the resiliently-deformable member 130.

The steering wheel cover 100 may be constructed of various types of material. The steering wheel cover 100 may be constructed of materials that are durable and maintain their material properties over a broad range of temperatures. The materials may be relatively soft to provide a comfortable grip for a user. The materials may include flame retardant properties, and may resist splitting or splintering. The materials may be resistant to ultra-violet damage from prolonged exposure to sun light.

To use the steering wheel cover 100, a user may detachably mount the cover 100 onto a steering wheel 102 of a vehicle, such as an all-terrain vehicle, automobile, boat, golf cart, or any other vehicle with a steering wheel. The user may repeatedly squeeze the resiliently-deformable regions 108 of the cover 100 to exercise and strengthen their hands, wrists, and forearms. The resiliently-deformable regions 108 may resiliently deform under the compressive force applied by the user. The deformation of the resiliently-deformable region 108 may allow the region 108 to continuously conform to the shape of the user's hand during use, enhancing the user's comfort, grip, and strength-building. When the user stops applying pressure to the resiliently-deformable regions 108, the region 108 resiliently returns to its original shape. By repeatedly squeezing the resiliently-deformable regions 108, the user may gain the benefit of both isometric and isotonic exercise. The user also may be able to exercise their hands, wrists, and forearms equally at the same time.

Specific muscle strength is the basis for speed, coordination, agility, and even flexibility. Without adequate levels of strength, it is extremely difficult to achieve maximum performance. Adequate levels of strength are important to injury prevention, not only in sports, but also at work and at home. The steering wheel cover is designed to strengthen a user's muscles, and may improve cardiovascular fitness, reduce stress, reduce road rage, lower blood pressure, reduce problems such as tennis elbow, tendinitis, and carpal tunnel syndrome. The steering wheel cover may isolate and strengthen the muscles of the hand, wrist, and forearm, and, isometrically, the chest and shoulders. The steering wheel cover may enable a user to exercise both hands individually, either spaced apart from one another or on the same resiliently-deformable region. By adjusting grip positions, the user may isolate and exercise the major muscles in their hands, fingers, wrists, and forearms. By increasing their strength and dexterity in their hands, fingers, wrists, and forearms, the user may increase performance in sports requiring grip and forearm strength, such as golf and tennis, and may reduce repetitive stress injuries as a result of excessive typing, for example.

The foregoing description has broad application. It should be appreciated that the concepts disclosed herein may apply to many types of steering wheels, in addition to the steering wheel described and depicted herein. Additionally, or alternatively, one or more features of the steering wheel cover may be integrally formed with the steering wheel, for example during manufacture of the steering wheel. For example, the resiliently-deformable members and outer layer of the steering wheel cover may be integrated into the steering wheel as a single, unitary component. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The phrases "at least one", "one or more", and "and/or", as used herein, are open-ended expressions that are both conjunctive and disjunctive in operation. The term "a" or "an" entity, as used herein, refers to one or more of that entity. As such, the terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

What is claimed is:

1. A steering wheel cover, comprising:
a base layer defining a toroid, the base layer having first and second inner circumferential edges spaced laterally apart from each other to define an opening for receiving a steering wheel;
multiple resilient members spaced circumferentially apart from one another along an outer surface of the base layer, each resilient member wrapping around the outer surface of the base layer from the first inner circumferential edge to the second inner circumferential edge of the base layer;
an outer layer covering the multiple resilient members and wrapping around the first and second inner circumferential edges of the base layer;
a first inner layer located between the base layer and the resilient members; and a second inner layer located between the first inner layer and the resilient members, wherein the second inner layer permits the resilient members to move relative to the first inner layer.

2. The steering wheel cover of claim 1, wherein each resilient member is formed of a gel material.

3. The steering wheel cover of claim 1, wherein each resilient member is attached to the base layer with a first line of attachment located adjacent to the first inner circumferential edge and a second line of attachment located adjacent to the second inner circumferential edge.

4. The steering wheel cover of claim 1, wherein each resilient member has longitudinal edge portions that taper inwardly toward the first and second inner circumferential edges of the base layer.

5. The steering wheel cover of claim 1, wherein each resilient member has end portions that taper inwardly toward the base layer.

6. The steering wheel cover of claim 1, wherein a radial thickness of the resilient members is greater than a radial thickness of the base layer.

7. The steering wheel cover of claim 1, wherein the first inner layer extends around substantially the entire outer surface of the base layer.

8. The steering wheel cover of claim 1, further comprising an intermediate outer layer located between the resilient members and the outer layer.

9. The steering wheel cover of claim 8, wherein the first inner layer and the intermediate outer layer have smaller radial thicknesses than the resilient members.

10. The steering wheel cover of claim 1, wherein each resilient member forms part of a resilient region of the steering wheel cover.

11. The steering wheel cover of claim 10, wherein each resilient region includes a first arc length defined at a first radius of curvature and a second arc length defined at a second radius of curvature that is less than the first radius of curvature, and wherein the first arc length is longer than a second arc length.

12. The steering wheel cover of claim 10, wherein the resilient regions are spaced apart from one another by less-deformable regions of the steering wheel cover.

13. A steering wheel cover for a vehicle, comprising:
a base layer;
two or more resilient gel cushions attached to the base layer for use as an exercise device, the two or more resilient gel cushions spaced circumferentially apart from one another along the base layer;
an outer layer covering the two or more resilient gel cushions; and
a foam pad located between the outer layer and the two or more resilient gel cushions.

14. The steering wheel cover of claim 13, further comprising a polyurethane leather backing located between the base layer and the one or more resilient gel cushions.

15. The steering wheel cover of claim 14, further comprising a layer of a copolymer of ethylene and vinyl acetate located between the polyurethane leather backing and the one or more resilient gel cushions.

16. The steering wheel cover of claim 13, wherein the base layer is formed as a singular body with a generally annular shape that at least partially surrounds an outer periphery of a steering wheel to secure the steering wheel cover to the steering wheel without fasteners.

17. A method of manufacturing a steering wheel cover, comprising:
positioning multiple resilient members around an outer surface of a base layer defining a toroid, wherein the resilient members are spaced circumferentially apart from one another along the outer surface of the base layer, wherein the base layer includes first and second inner circumferential edges spaced laterally apart from each other to define an opening for receiving a steering wheel;
wrapping an outer layer covering around the multiple resilient members and around the first and second inner circumferential edges of the base layer;
positioning a first inner layer between the base layer and the resilient members;
positioning a second inner layer between the first inner layer and the resilient members, the second inner layer permitting the resilient members to move relative to the first inner layer; and
attaching the resilient members and the outer layer covering to the base layer along lines of attachment located adjacent the first and second inner circumferential edges of the base layer such that each resilient member wraps around the outer surface of the base layer from the first inner circumferential edge to the second inner circumferential edge.

* * * * *